United States Patent
Nago

(10) Patent No.: US 8,161,840 B2
(45) Date of Patent: Apr. 24, 2012

(54) BICYCLE BRAKE CONTROL DEVICE WITH REACH ADJUSTMENT

(75) Inventor: Daisuke Nago, Sakai (JP)

(73) Assignee: Shimano, Inc., Sakai-ku, Sakai, (JP)

( * ) Notice: Subject to any disclaimer, the term of this patent is extended or adjusted under 35 U.S.C. 154(b) by 2482 days.

(21) Appl. No.: 10/904,093

(22) Filed: Oct. 22, 2004

(65) Prior Publication Data

US 2005/0097979 A1    May 12, 2005

(30) Foreign Application Priority Data

Oct. 31, 2003    (JP) .................................. 2003-372031

(51) Int. Cl.
*F16C 1/10* (2006.01)
*G05G 11/00* (2006.01)
*G05G 13/00* (2006.01)

(52) U.S. Cl. ............................ 74/502.2; 74/488; 74/489

(58) Field of Classification Search ................ 74/502.2, 74/489, 488; 188/2 D
See application file for complete search history.

(56) References Cited

U.S. PATENT DOCUMENTS

| 4,425,819 | A | 1/1984 | Shimano |
| 4,459,871 | A | 7/1984 | Shimano |
| 4,945,785 | A | 8/1990 | Romano |
| 5,279,179 | A * | 1/1994 | Yoshigai ...................... 74/502.2 |
| 5,979,266 | A * | 11/1999 | Nagano ........................ 74/502.2 |
| 7,073,635 | B2 * | 7/2006 | Gutierrez Fernandez .... 188/2 D |

FOREIGN PATENT DOCUMENTS

| DE | 2434300 A1 | 1/1976 |
| EP | 0 242 613 | * 10/1987 |
| EP | 389931 B1 | 12/1993 |
| EP | 0 639 495 A1 | * 2/1995 |
| EP | 0788968 A2 | 8/1997 |
| EP | 1342655 A2 | 9/2003 |
| GB | 856796 | 12/1960 |

OTHER PUBLICATIONS

Shimano 2003 Bicycle Components Trade Sales & Support Manual, p. 129.

* cited by examiner

*Primary Examiner* — Vinh T. Luong

(74) *Attorney, Agent, or Firm* — James A. Deland

(57) ABSTRACT

A bicycle brake control device comprises a mounting bracket for mounting the device to a bicycle, a lever mounted to the mounting bracket for rotation around a pivot axis, and an adjustment unit. The adjustment unit comprises a first adjustment component and a second adjustment component, wherein the first adjustment component adjusts a selected position of the lever relative to the mounting bracket, and the second adjustment component adjusts a position of a brake operating element when the lever is in the selected position.

24 Claims, 7 Drawing Sheets

PRIOR ART

BICYCLE BRAKE CONTROL DEVICE WITH REACH ADJUSTMENT

BACKGROUND OF THE INVENTION

The present invention is directed to bicycles and, more particularly, to a bicycle brake control device.

Bicycle brake control devices typically are attached to the handlebar of the bicycle. A conventional brake control device comprises a mounting bracket and a lever, wherein the mounting bracket is mounted on the handlebar, and the lever is pivotably mounted to the mounting bracket. With the exception of reverse levers, brake levers are structured in such a way that the tips point away from the handlebar, regardless of the shape of the handlebar. The lever is connected to a brake device by a brake wire, wherein a return spring that forms a part of the brake device pulls the brake wire in a direction toward the brake device. This causes the lever to rotate toward an initial, nonoperating position. The rider operates the brake by placing the fingers on the lever and by moving the tip of the lever from the initial, nonoperating position toward the handlebar. Braking is released by allowing the lever to return to its initial position.

In conventional brake control devices, the initial position of the lever is determined by the structure of the brake lever and the mounting bracket, and it is usually set to accommodate the average hand size. As a result, the tip of the lever sometimes can be too far away from the handlebar for people with smaller hands to comfortably reach. Also, since the distance from the lever pivot axis at which the fingers grip the lever determines torque applied to the brake wire, the brake device can be operated efficiently with light finger force when the fingers grip near the tip of the lever. However, if it is difficult for the rider's hand to reach the tip of the lever, then the rider is forced to grip the lever closer to the pivot axis. This makes it necessary to apply significantly more force to apply the brakes effectively.

To alleviate such problems, devices have been developed that allow the initial position of the brake lever to be adjusted closer to the handlebar. See, for example, Shimano 2003 Bicycle Components Trade Sales & Support Manual, page 129. Such adjusting devices typically are placed between the mounting bracket and the lever to form a gap between them, thereby setting the initial position of the lever closer to the handlebar.

It is also known to construct brake control devices such that the lever ratio changes as the lever is rotated from the initial position toward a brake operating position. Such a brake control device is disclosed in Japanese Patent Number 3,053, 835. The device is formed in such a way that the lever ratio initially causes the brake wire to be pulled at a faster rate during initial rotation of the brake lever until the brake pad of the brake device contacts the wheel rim. Thereafter, the lever ratio is modified to cause a powerful braking force to be applied to the wheel rim with minimum effort by the rider. The brake control device disclosed in the foregoing reference comprises a cam attached to the mounting bracket and a guiding groove formed on the lever. A nipple support used to support a cable end nipple attached to the end of the brake cable is supported by the guiding groove. The cam presses the nipple support toward the pivot axis of the brake lever as the brake lever rotates from the initial position toward the brake operating position, thereby changing the lever ratio as the brake control device operates. Furthermore, the guiding groove is formed in such a way that one end is open and the other end forms a groove floor. The groove floor is located closer to the pivot axis than the open end, and the groove floor is located forwardly of the open end when the lever is in the initial position. The contour of the cam controls the lever ratio until the lever has rotated to a certain position, typically when the groove floor is located directly below the open end. Thereafter, the nipple support slides in the guiding groove toward the pivot axis until the nipple support rests against the groove floor. At that time the rate of pulling of the brake wire decreases with a corresponding increase in mechanical advantage, thus ensuring strong braking force with minimum effort by the rider.

When a conventional adjusting device is used to change the initial position of a lever so that the tip of the lever is closer to the handlebar, wherein the brake control device is of the kind that varies the lever ratio during operation, the nipple support may be pressed by the cam toward the pivot axis in the new initial position. As a result, the lever pulls the brake wire at a reduced rate right from the start, and there may be insufficient total wire stroke to properly operate the brake device.

SUMMARY OF THE INVENTION

The present invention is directed to various features of a bicycle brake control device. In one embodiment, a bicycle brake control device comprises a mounting bracket for mounting the device to a bicycle, a lever mounted to the mounting bracket for rotation around a pivot axis, and an adjustment unit. The adjustment unit comprises a first adjustment component and a second adjustment component, wherein the first adjustment component adjusts a selected position of the lever relative to the mounting bracket, and the second adjustment component adjusts a position of a brake operating element when the lever is in the selected position. Additional inventive features will become apparent from the description below, and such features alone or in combination with the above features may form the basis of further inventions as recited in the claims and their equivalents.

DETAILED DESCRIPTION OF THE EMBODIMENTS

Figure 1:
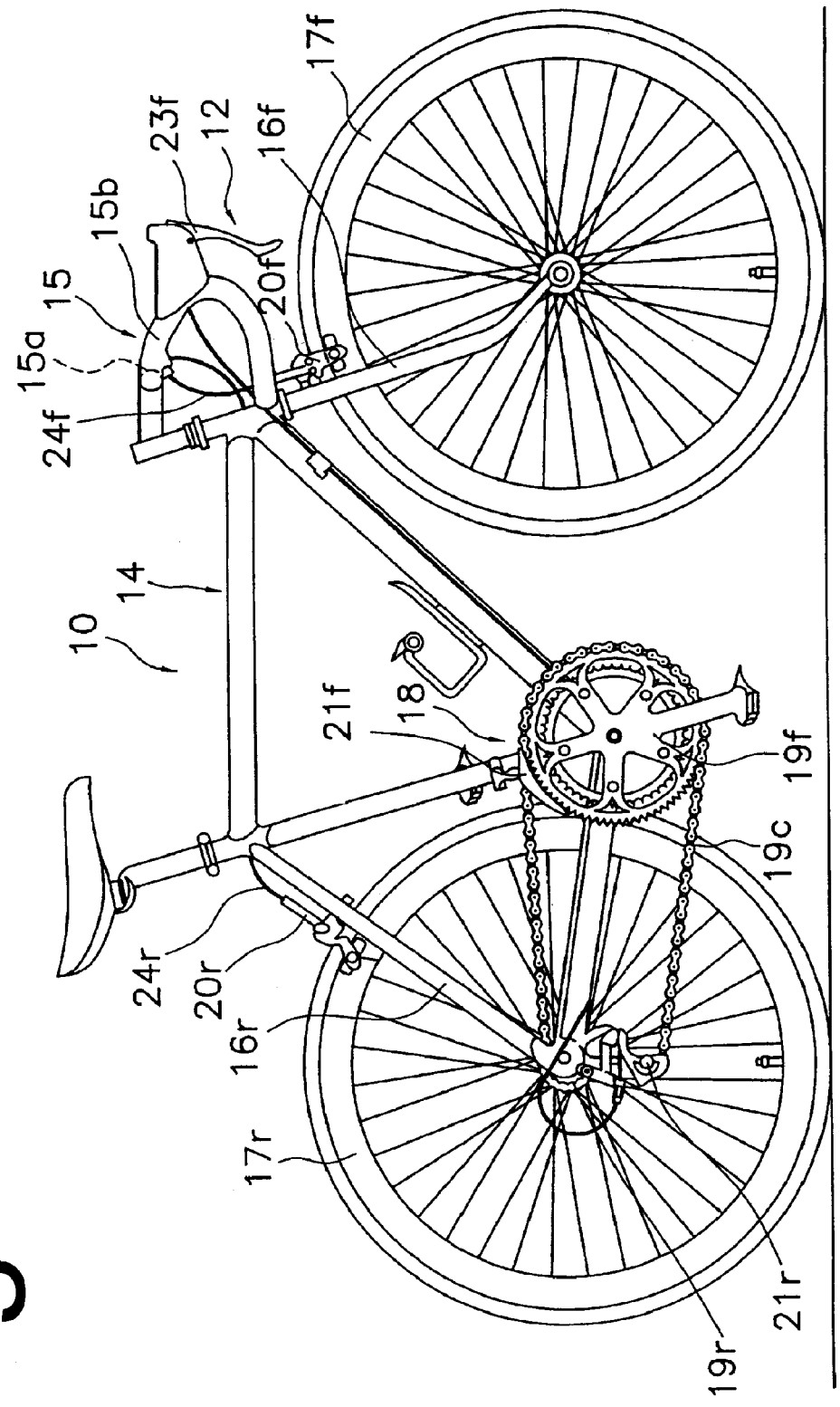
FIG. 1 is a side view of a particular embodiment of a bicycle.

FIG. 1 is a side view of a particular embodiment of a conventional road racer type bicycle 10. Bicycle 10 comprises a bicycle frame 14 with front and rear forks 16f and 16r, front and rear wheels 17f and 17r, a handlebar 15, a drive device 18, and a brake system 12. Drive device 18 includes front and rear sprockets 19f and 19r, a chain 19c, and front and rear derailleurs 21f and 21r.

Handlebar 15 is a drop-type handlebar comprising a central part 15a and a pair of arched components 15b disposed on opposite sides of central part 15a (only the right side arched component is shown). Central part 15a extends laterally substantially perpendicular to the direction in which bicycle 10 travels. Each arched component 15b is curved initially in the longitudinal direction toward the front of the bicycle 10, then both forward and downward, and then rearward with the tip of the handlebar facing rearwardly.

Brake system 12 comprises front and rear brake devices 20f and 20r mounted on the front and rear forks 16f and 16r, front and rear brake control devices 23f and 23r (only the front brake control device 23f is shown) for operating the brake devices 20f and 20r, respectively, and brake wires 24f and 24r for connecting the brake control devices 23f and 23r to their respective brake devices 20f and 20r. In this embodiment, brake devices 20f and 20r are side pull caliper brakes.

Figure 2:
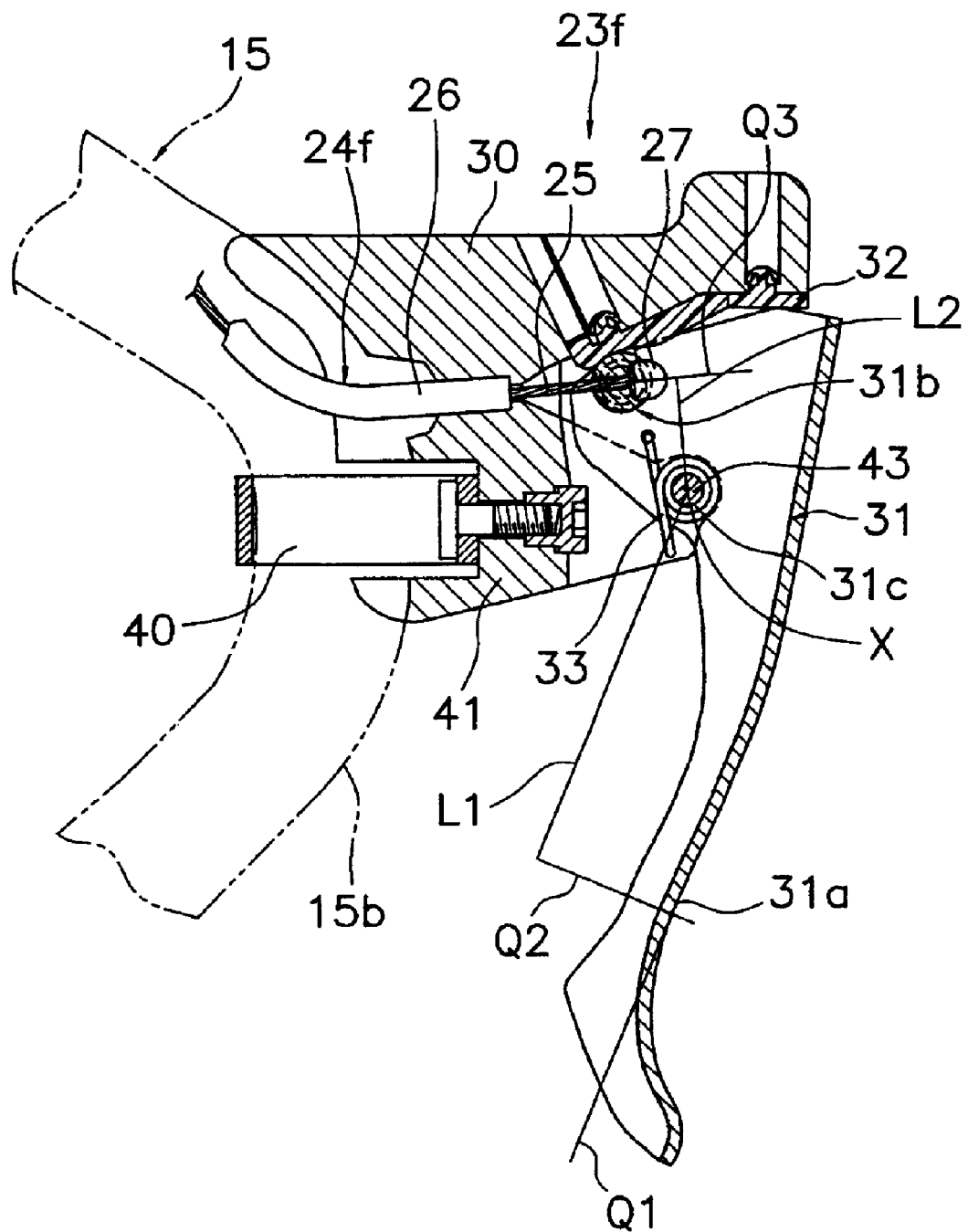
FIG. 2 is a side cross sectional view of a particular embodiment of a brake control device.
Figure 3:
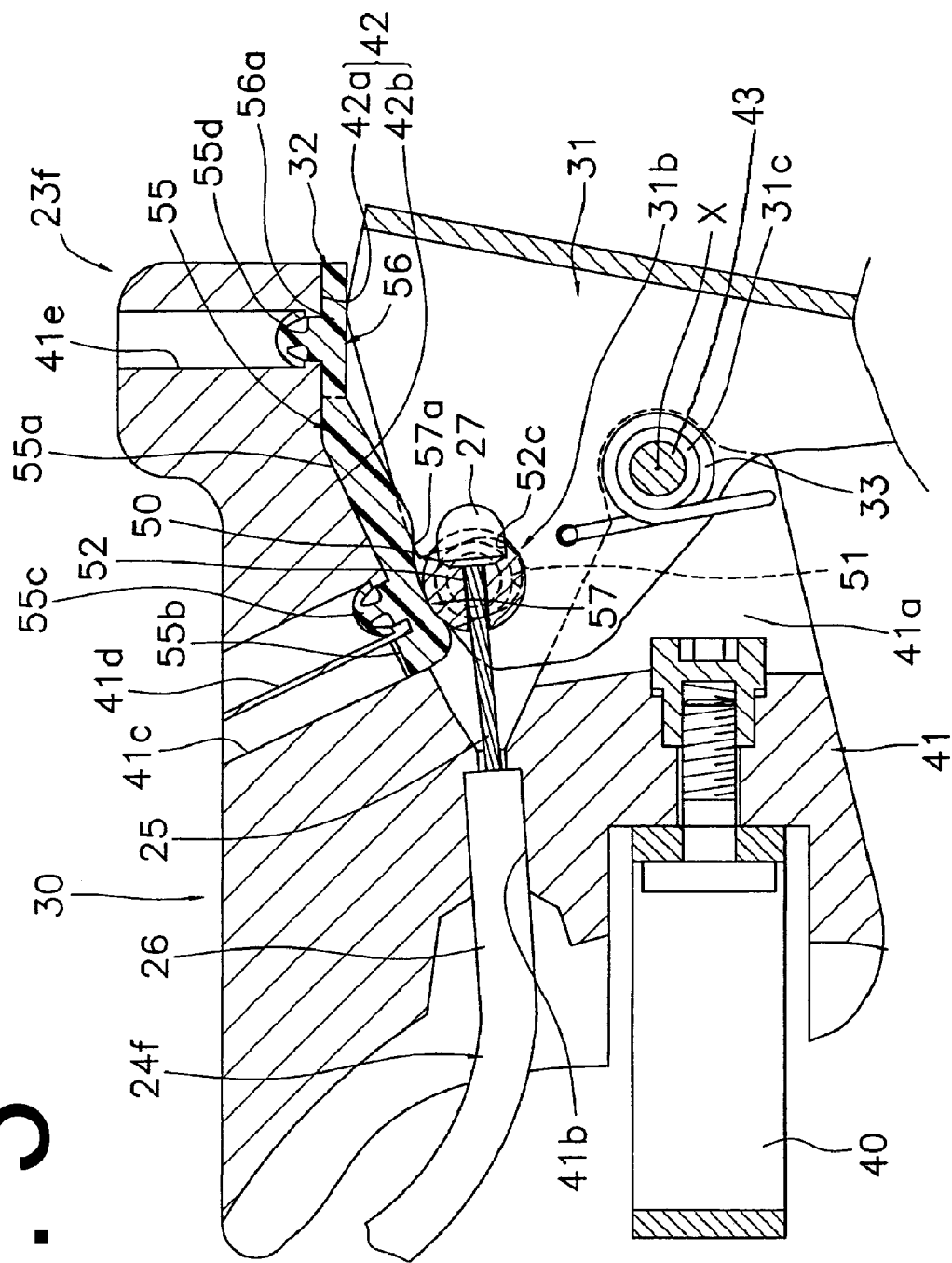
FIG. 3 is a more detailed cross sectional view of the brake control device.

Since brake control devices 23f and 23 have the same structure, only front brake control device 23f will be described. As shown in FIGS. 2 and 3, brake wire 24f has a conventional structure comprising an inner cable 25 that slides within an outer casing 26. A cable end nipple 27 is fixed to the end of inner cable 25. A return spring (not shown) in brake device 20f pulls brake wire 24 in a direction toward brake device 20f. In this embodiment, cable end nipple 27 does not have a conventional round shape. Instead, cable end nipple 27 is bullet-shaped with a spherical tip.

Brake control device 23f comprises a mounting bracket 30 adapted to be mounted on the curved part 15b of handlebar 15, a manually operated lever 31, a torsion spring 33 for biasing lever 31 to an initial, non-operating position, and an adjustment unit 32. Mounting bracket 30 comprises a band 40 and a bracket main body 41, wherein band 40 is mounted to handlebar 15, and bracket main body 41 is fixed by band 40 to the curved part 15b of handlebar 15. Bracket main body 41 defines a lever mounting space 41a that is open in front and below for receiving lever 31 therein. A wire support hole 41b extends through the rear of bracket main body 41 and communicates with lever mounting space 41a. A positioning recess (opening) 41c and two bottom-stepped engagement recesses (openings) 41d and 41e are formed in the top of bracket main body 41 and communicates with lever mounting space 41a. Bracket main body 41 forms a contact surface 42 at the top of lever mounting space 41a to contact lever 31 when adjustment unit 32 is not mounted to bracket main body 41. Contact surface 42 may comprise two flat surfaces 42a and 42b, wherein positioning recess 41c and engagement recess 41d are located at flat surface 42b, and engagement recess 41e is located at flat surface 42a.

Lever 31 is mounted to bracket main body 41 through a pivot shaft 43 that extends through a pivot support component 31c. As a result, lever 31 rotates around a pivot axis X that is generally parallel to the central part 15a of handlebar 15. Torsion spring 33 is wound around pivot shaft 43 with one end attached to lever 31 and the other end attached to bracket main body 41. Torsion spring 33 biases lever 31 toward the initial position (counterclockwise in FIG. 2). Lever 31 may be made from aluminum, for example, and comprises a vertically elongated member that is bent to form a U-shaped tip. A lower portion of lever 31 forms a brake operating component 31a, and an upper portion of lever 31 forms a brake operating element (wire) detent 31b. Brake operating component 31a is structured to be grasped by the rider's fingers, and brake operating element detent 31b is structured to support the end of brake wire 24f.

As shown more clearly in FIG. 3, brake operating element detent 31b includes a cable nipple moving mechanism 50. Cable nipple moving mechanism 50 allows cable end nipple 27 to move toward pivot axis X when lever 31 pivots around pivot axis X from the initial position toward the curved portion 15b of handlebar 15. Cable nipple moving mechanism 50 comprises a pair of movement support components 51 (more clearly seen in FIG. 4) and a nipple detent member 52 (more clearly seen in FIG. 5). Movement support components 51 are formed as a pair of grooves spaced apart in the direction of pivot axis X. Movement support components 51 slidably support nipple detent member 52, and nipple detent member 52 supports cable end nipple 27 attached to the end of brake wire 24f.

Figure 4:
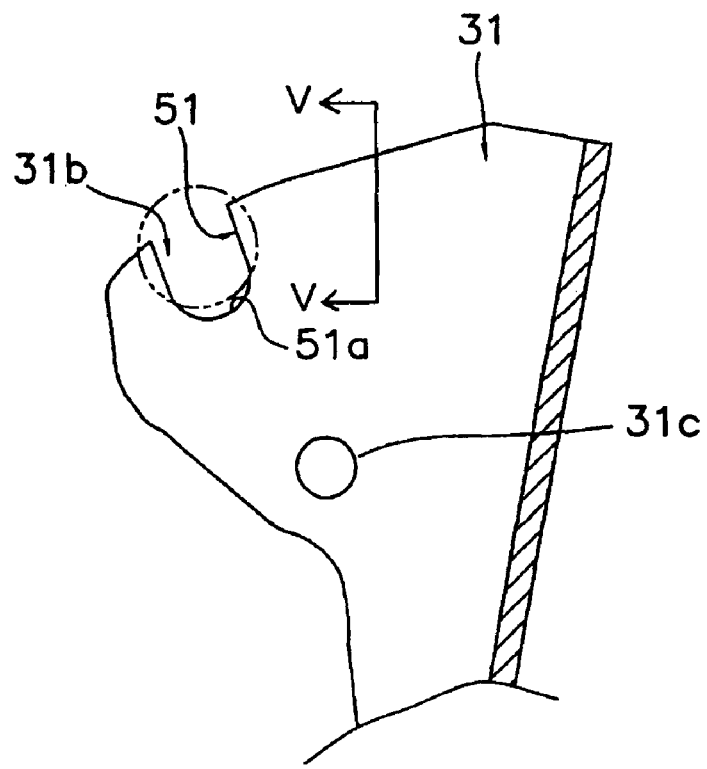
FIG. 4 is a detailed view of a top portion of the lever.

As shown in FIG. 4, each movement support component 51 comprises a U-shaped groove that has an open end at the top of lever 31 and forms a groove floor 51a. Groove floor 51a is located closer to pivot axis X than the open end, and groove floor 51a is located more to the front of lever 31 than the open end when lever 31 is in the initial position. As a result, nipple detent member 52 is located near the open end when lever 31 is in the initial position. When lever 31 rotates around pivot axis X from the initial position toward curved portion 15a of handlebar 15, nipple detent member 52 begins to slide toward pivot axis X when groove floors 51a are disposed vertically beneath their corresponding open ends until nipple detent member 52 rests against the groove floors 51a.

Figure 5:
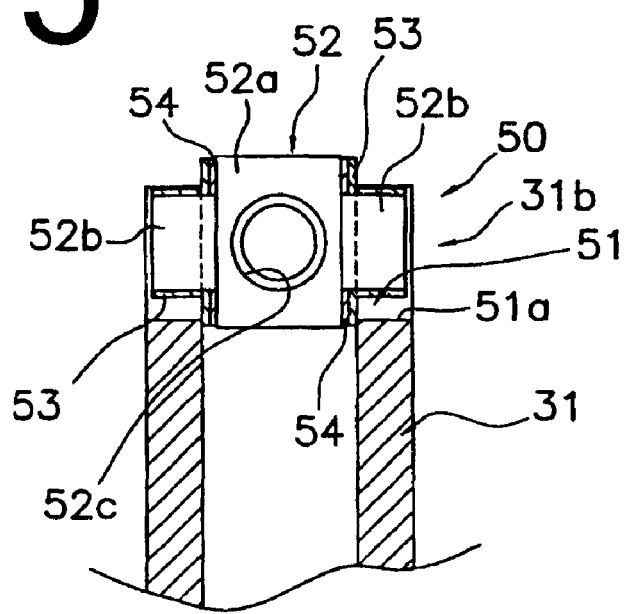
FIG. 5 is a front cross sectional view taken along line V-V of FIG. 4 showing a cable nipple moving mechanism.

As shown in FIG. 5, nipple detent member 52 is a stepped cylindrical member comprising a centrally disposed large diameter component 52a forming a nipple support and a pair of small diameter components 52b that extend axially outward from opposite sides of large diameter component 52a to form first and second engaging components for engaging the movement support components 51. A stepped nipple detent hole 52c is formed in large diameter component 52a to retain cable end nipple 27. A flanged bushing 53 is attached to each small diameter component 52b, wherein a washer 54 is disposed between the flange of each bushing 53 and large diameter component 52a. Each bushing 53 has an outside diameter that is slightly smaller than the width of the groove of its corresponding movement support component 51. Bushings 53 function as bearings for nipple detent member 52. As a result, nipple detent member 52 is smoothly guided by movement support components 51.

In this embodiment, adjustment unit 32 is disposed between mounting bracket 30 and lever 31. As shown more clearly in FIG. 3, adjustment unit 32 comprises an adjustment main body 55 mounted to bracket main body 41, a first adjustment component 56 integrally formed as one-piece with adjustment main body 55, and a second adjustment component 57 integrally formed with adjustment main body 55. Adjustment unit 32 may be formed, for example, by synthetic resin. First adjustment component 56 adjusts the initial position of lever 31 relative to mounting bracket 30, and second adjustment component 57 adjusts the initial position of brake wire 24f relative to pivot axis X via nipple detent member 52 and cable end nipple 27.

Adjustment main body 55 comprises an attachment surface 55a adapted to contact flat surfaces 42a and 42b of mounting bracket 30, a positioning protrusion 55b disposed in positioning recess 41c, and two umbrella-shaped engagement protrusions 55c and 55d engaged by the stepped portions of engagement recesses 41d and 41e. First adjustment component 56 has a gap-forming component 56a that is located between mounting bracket 30 and lever 31 to form a gap therebetween. As a result, the initial position of lever 31 may be adjusted so that brake operating component 31a of lever 31 is positioned closer to handlebar 15, thus making it easier for riders with smaller hands to grip the end of lever 31. Second adjustment component 57 is structured so that the initial position of cable end nipple 27 relative to pivot axis X is the same as when the initial position of lever 31 is not adjusted.

Before proceeding further, the concept of lever ratio shall be explained with reference to FIG. 2. The lever ratio is defined as the ratio of an input arm length L1 to an output arm length L2 (L1/L2). The input arm length L1 is the length of a line (indicated by reference L1) that extends from pivot axis X to a line Q2, wherein line Q2 is perpendicular to a line Q1 that is tangent to the surface of brake operating component 31a at the intended finger contact location. The output arm length is the length of a line (indicated by reference L2) that extends from pivot axis X to a line Q3, wherein line Q3 is coaxial with inner cable 25.

Figure 6:
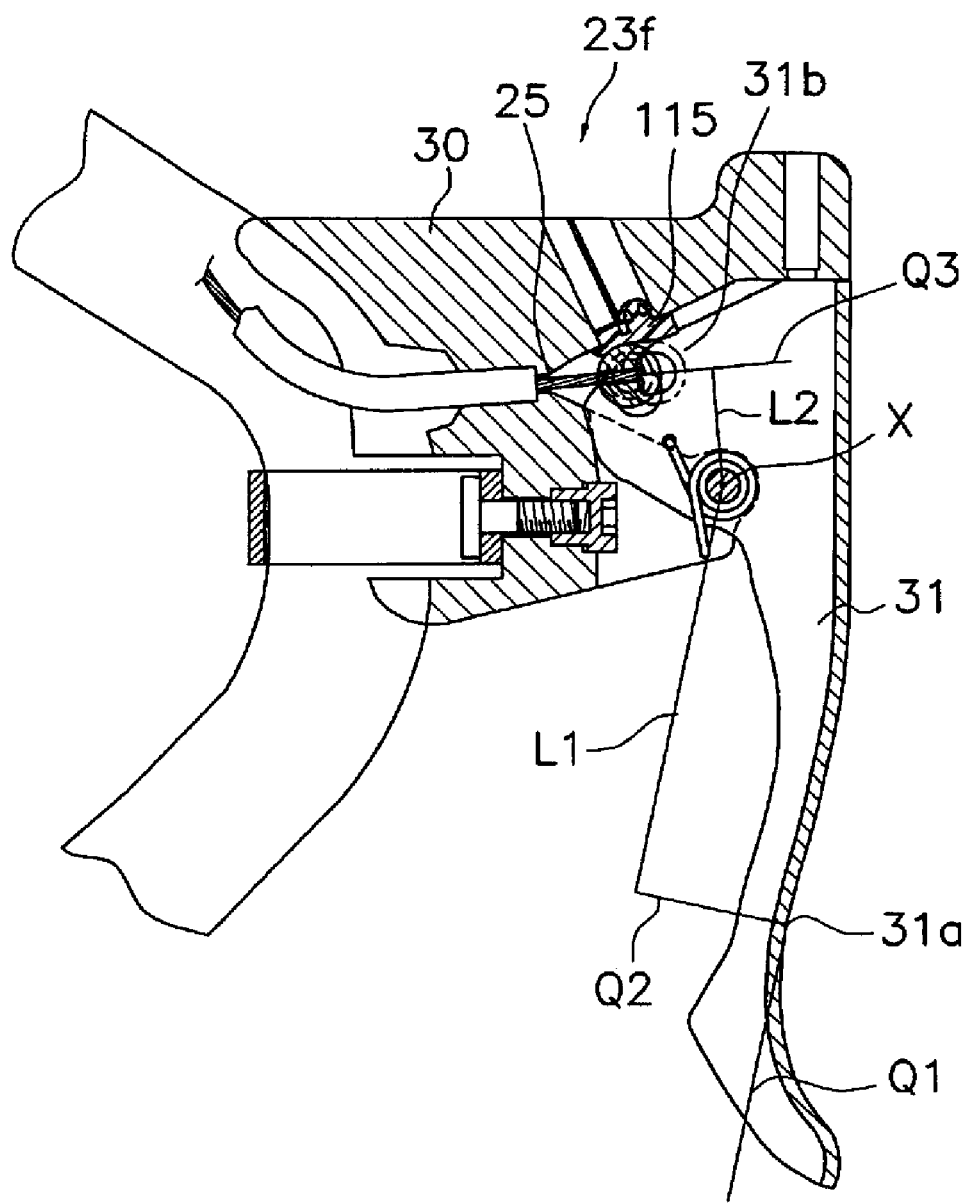
FIG. 6 is a side cross sectional view of a conventional brake control device, wherein an adjustment component varies the lever ratio as the lever is operated.

FIG. 6 is a side cross sectional view of a conventional brake control device, wherein an adjustment component 115 varies the lever ratio as the lever is operated. In this case, if a position adjustment component is subsequently mounted on the mounting bracket 30 between mounting bracket 30 and lever 31 to adjust the initial position of lever 31, adjustment component 115 will press the cable end nipple closer to the pivot axis X (decrease the length of the output lever arm), with a corresponding increase in the lever ratio. As a result, the total wire stroke of inner cable 25 as lever 31 pivots from the initial position to a braking position where the braking device is fully operative decreases and may be insufficient.

In the present embodiment, the second adjustment component 57 is formed so that the initial lever ratio is approximately the same as that shown in FIG. 6 (i.e., as if no adjustment component were provided to change the position of lever 31 relative to mounting bracket 30). In other words, second adjustment component 57 is configured so as to contact large diameter component 52a of nipple detent 52 so that nipple detent 52 is disposed on the line Q3 that is coaxial with inner cable 25 when the initial position of lever 31 is unadjusted. More specifically, as shown more clearly in FIG. 3, a cam surface 57a in the form of an arched surface is formed in second adjustment component 57. Cam surface 57a gradually approaches pivot axis X from the initial nipple position. Thus, when lever 31 pivots in the braking direction, large diameter component 52a of nipple detent 52 subsequently contacts the inwardly projecting portion of cam surface 57a and gradually moves toward pivot axis X, and the lever ratio gradually increases while still providing a rapid rate of pulling of inner cable 25. After each groove floor 51a is disposed directly under the open end of its corresponding groove, nipple detent 52 moves toward the groove floors 51a as a result of the force on inner cable 25 caused by brake device 20f. At that time, the lever ratio L1/L2 is at its greatest, and the braking force increases. By configuring movement support component 51 so that groove floors 51a are disposed directly under the open end of the grooves at approximately the time that the brake shoe of brake device 20f contacts the wheel rim, it is possible to ensure a suitable brake wire stroke even when first adjustment component 56 adjusts the initial position of lever 31.

In order to mount adjustment unit 32 to a brake control device such as brake control device 23f shown in FIG. 6, the brake cable 24f and conventional adjustment component 115 are first removed. Lever 31 then is rotated in the braking direction to open a gap between lever 31 and bracket main body 41. The engagement protrusions 55c and 55d are hooked onto the stepped portions of the engagement recesses 41d and 41e by pressing the two engagement protrusions 55c and 55d into the engagement recesses 41d and 41e, and the positioning protrusion 55b is positioned in the positioning recess 41c. Once adjustment unit 32 is so mounted, brake cable 24f may be reattached to complete the operation. The initial position of lever 31 is thus adjusted so that the brake operating component 31a is closer to handlebar 15, but the initial position of inner cable 25 is set in such a way that the lever ratio is not much different than it was before mounting adjustment unit 32.

Figure 7:
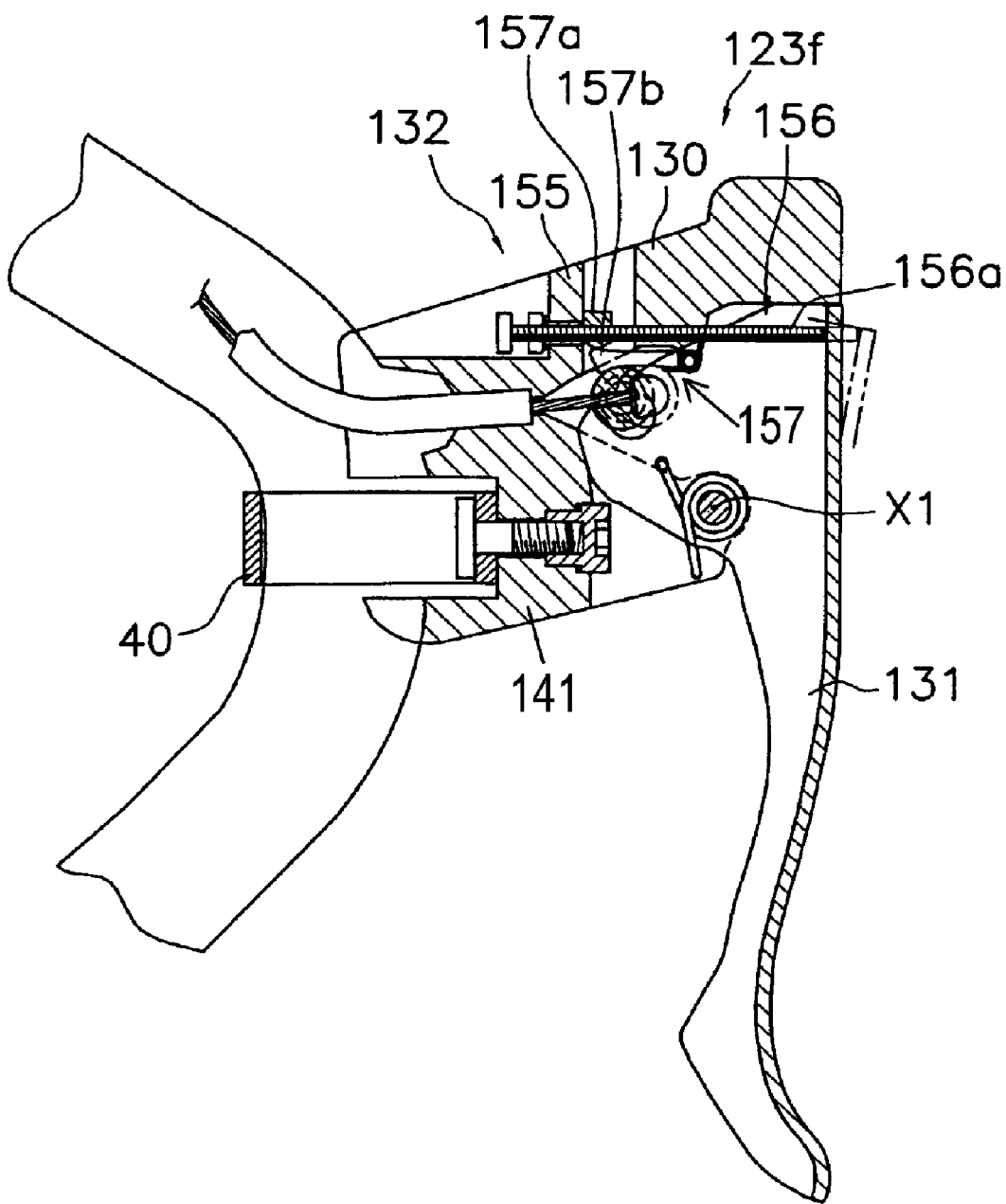
FIG. 7 is a side cross sectional view of another embodiment of a brake control device.
Figure 8:
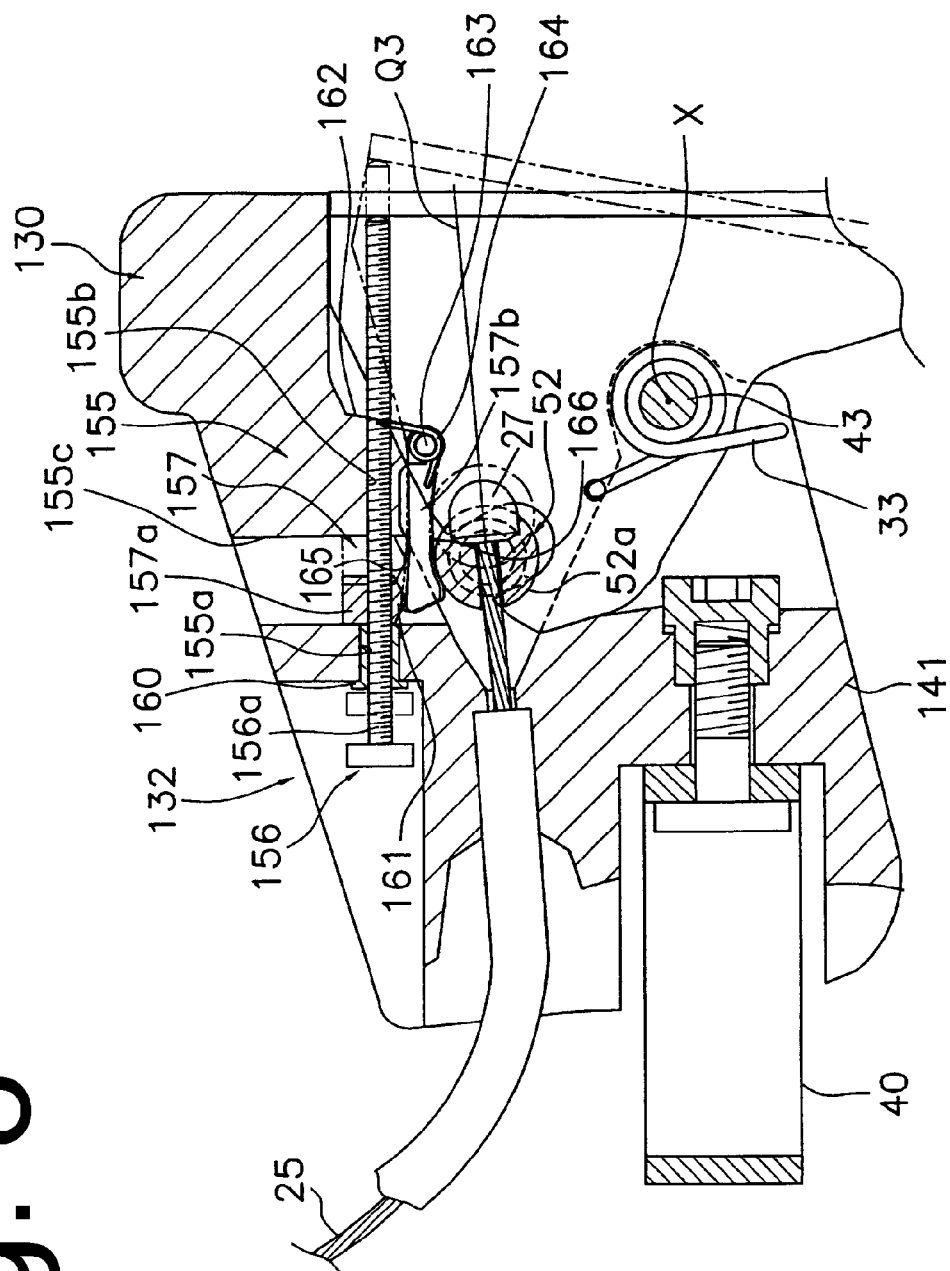
FIG. 8 is a more detailed cross sectional view of the brake control device shown in FIG. 7.

FIGS. 7 and 8 are side cross sectional views of another embodiment of a brake control device, indicated at 123f. In the first embodiment, adjustment unit 32 allowed the initial position of lever 31 to be adjusted to one position, but this embodiment allows the initial position of a lever 131 to be adjusted to many positions.

As shown in FIGS. 7 and 8, an adjustment unit 132 comprises an adjustment main body 155 integrally formed as one piece with a bracket main body 141 of a mounting bracket 130, a first adjustment component 156 and a second adjustment component 157. First adjustment component 156 comprises an adjustment threaded component 156a that screws into adjustment main body 155. Second adjustment component 157 comprises an adjustment nut 157a and a cam member 157b, wherein adjustment nut 157a screws onto adjustment threaded component 156a, and cam member 157b engages adjustment nut 157a.

Adjustment main body 155 has a first shaft support 155a and a second shaft support 155b, wherein first shaft support 155a is spaced apart coaxially from second shaft support second shaft support 155b at the top of bracket main body 141 to form a nut housing component 155c. A flanged nut 160 is fixed to first shaft support 155a, wherein adjustment threaded component 156a screws into flanged nut 160 so that an end of adjustment threaded component 156a provides a pressing force against the upper portion of lever 131. As a result, adjustment threaded component 156a can be screwed into flanged nut 160 so that adjustment threaded component 156a and lever 131 moves from the positions shown by solid lines in FIG. 8 to the positions shown by phantom lines.

Cam member 157b includes an upper first cam surface 165 and a lower second cam surface 166, and it is pivotably mounted to a pivot support 162 formed in bracket main body 141 through a pivot shaft 163. The bottom side of adjustment nut 157a is rounded to form a pushing component 161 that contacts first cam surface 165. Cam member 157b is biased clockwise to contact pushing component 161 of adjustment nut 157a by a torsion spring 164 wound around pivot shaft 163. Second cam surface 166 contacts large diameter component 52a of nipple detent 52 so as to set the initial position of nipple detent 52 to be in the vicinity of line Q3 that is coaxial with inner cable 25 as in the first embodiment.

Adjustment nut 157a is nonrotatably fixed within nut housing component 155c but is axially movable therein. As a result, adjustment nut 157a moves back and forth within nut housing component 155c in response to rotation of adjustment threaded component 156a, and the position of cam member 157b is set accordingly.

In operation, adjustment threaded component 156a is turned so that the tip thereof provides a pressing force against the upper portion of lever 31, thus causing lever 31 to pivot clockwise and thereby fine tune the initial position of lever 31 relative to main bracket body 141. Adjustment nut 157a moves at the same time, thus causing cam member 157b to pivot to adjust the initial position of nipple detent 52 in close proximity to line Q3. Thus, as the initial position of lever 31 is adjusted, the initial position of inner cable 25 is adjusted so as not to significantly alter the lever ratio.

While the above is a description of various embodiments of inventive features, further modifications may be employed without departing from the spirit and scope of the present invention. For example, while the disclosed embodiments showed a brake control device mounted to a drop-style handlebar, the brake control device also could be used with straight or other types of handlebars. While the first adjustment component 56 in the first embodiment did not come into contact with the entire upper surface of lever 31, another embodiment could configure first adjustment component 56 so that it contacts the entire upper surface of lever 31. While adjustment nut 157*a* and cam member 157*b* in the second embodiment were formed as separate units, adjustment nut 157*a* and cam member 157*b* may be connected so as to pivot in response to movement of adjustment nut 157*a*. In that case, no coil spring 164 may be needed.

In the above embodiments, a nipple detent 52 was provided because the cable end nipple 27 was bullet-shaped. However, the cable end nipple could be cylindrical, with inner cable 25 fixed to the axial center of the cylinder. In that case, the cable end nipple may be directly mounted on the pair of movement support components 51 without using a nipple detent. Also, while the brake operating component (e.g., 31*a*) and wire detent (e.g., 31*b*) were unitarily formed with lever 31, they may be formed as separate components.

The described embodiments included brake control devices with no other components. However, if desired a shift control mechanism for a bicycle transmission, such as one of derailleurs 21*f* and 21*r*, could be housed in the brake control devices. This is especially true for shift control devices that are operated at least in part by rotating the brake lever in a direction that is different from the brake operating direction.

The size, shape, location or orientation of the various components may be changed as desired. Components that are shown directly connected or contacting each other may have intermediate structures disposed between them. The functions of one element may be performed by two, and vice versa. The structures and functions of one embodiment may be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus or emphasis on a particular structure or feature.

What is claimed is:

1. A bicycle brake control device adapted to move a brake operating element, wherein the device comprises:
    a mounting bracket for mounting the device to a bicycle;
    a lever mounted to the mounting bracket for rotation around a pivot axis,
    wherein the lever comprises a brake operating component and a brake operating element detent; and
    an adjustment unit comprising:
        a first adjustment component that adjusts a selected position of the lever relative to the mounting bracket; and
        a second adjustment component that adjusts a position of the brake operating element when the lever is in the selected position.

2. The device according to claim 1 wherein the selected position is an initial position of the lever.

3. The device according to claim 2 wherein the initial position is a nonoperated position of the lever.

4. The device according to claim 1 wherein the second adjustment component adjusts a position of the brake operating element relative to the pivot axis.

5. The device according to claim 4 wherein the second adjustment component adjusts a position of the brake operating element toward or away from the pivot axis.

6. The device according to claim 1 wherein the first adjustment component and the second adjustment component are coupled to each other.

7. The device according to claim 1 wherein the first adjustment component and the second adjustment component are one-piece.

8. The device according to claim 1 wherein the brake operating element detent comprises a cable nipple moving mechanism structured to allow a cable end nipple to move toward the pivot axis as the lever moves from a nonoperating position toward a braking position.

9. The device according to claim 8 wherein the cable nipple moving mechanism comprises a groove formed in the lever.

10. The device according to claim 9 wherein the cable nipple moving mechanism comprises a pair of the grooves spaced apart in a direction of the pivot axis.

11. The device according to claim 8 wherein the cable nipple moving mechanism further comprises:
    a nipple detent member adapted to support the cable end nipple; and
    a movement support component adapted to support the nipple detent member.

12. The device according to claim 11 wherein the nipple detent member comprises:
    a nipple support having a nipple detent hole for supporting the cable end nipple; and
    a first engaging component structured to engage the movement support component.

13. The device according to claim 12 wherein the nipple detent member further comprises a second engaging component structured to engage the movement support component.

14. The device according to claim 13 wherein the nipple support is disposed between the first engaging component and the second engaging component.

15. The device according to claim 1 wherein one of the mounting bracket and the adjustment unit includes an engagement recess, and wherein the other one of the mounting bracket and the adjustment unit includes an engagement protrusion that engages the engagement recess.

16. The device according to claim 1 wherein the first adjustment component comprises a gap-forming component disposed between the lever and the mounting bracket, and wherein the second adjustment component comprises a cam surface structured to move the brake operating element toward the pivot axis as the lever moves from a nonoperating position toward a braking position.

17. The device according to claim 16 wherein the brake operating element detent comprises a nipple detent member adapted to support the cable end nipple and a movement support component adapted to support the nipple detent member, and wherein the cam surface is structured to move the nipple detent member toward the pivot axis as the lever moves from a nonoperating position toward a braking position.

18. The device according to claim 1 wherein the adjustment unit further comprises an adjustment main body, wherein the first adjustment component comprises an adjustment threaded component that screws into the adjustment main body and provides a pressing force against the lever, and wherein the second adjustment component moves the brake operating element in response to rotation of the adjustment threaded component.

19. The device according to claim 18 wherein the second adjustment component comprises an adjustment nut that screws onto the adjustment threaded component.

20. The device according to claim 19 wherein the adjustment nut moves in a direction of the adjustment threaded component in response to rotation of the adjustment threaded component.

21. The device according to claim 20 wherein the second adjustment component further comprises a cam that moves in response to movement of the adjustment nut.

22. The device according to claim 21 wherein the cam engages the adjustment nut.

23. The device according to claim 22 wherein the second adjustment component further comprises a biasing member that biases the cam toward the adjustment nut.

24. The device according to claim 21 wherein the brake operating element detent comprises a nipple detent member adapted to support the cable end nipple and a movement support component adapted to support the nipple detent member, and wherein the cam is structured to move the nipple detent member toward the pivot axis in response to movement of the adjustment nut.

* * * * *